United States Patent [19]

Bonkowski

[11] Patent Number: 5,164,213

[45] Date of Patent: Nov. 17, 1992

[54] PROCESS FOR MAKING LOW CALORIE AND LOW CHOLESTEROL MUSCLE MEAT

[75] Inventor: Alexander T. Bonkowski, Macon, Ill.

[73] Assignee: Archer Daniels Midland Corporation, Decatur, Ill.

[21] Appl. No.: 643,547

[22] Filed: Jan. 18, 1991

[51] Int. Cl.$^5$ .............................................. A23B 4/023
[52] U.S. Cl. .................... 426/281; 426/332; 426/641; 426/646; 426/652
[58] Field of Search ............... 426/281, 332, 641, 646, 426/652, 649

[56] References Cited

U.S. PATENT DOCUMENTS

| | | | |
|---|---|---|---|
| 2,816,035 | 12/1957 | Glabe | 426/332 |
| 3,664,850 | 5/1972 | Kentor | 426/332 |
| 4,332,823 | 6/1982 | Bueme | 426/641 |
| 4,382,098 | 5/1983 | Bolin | 426/646 |
| 4,402,987 | 9/1983 | von Lersner | 426/281 |
| 4,478,859 | 10/1984 | Fox | 426/332 |
| 4,500,559 | 2/1985 | Bender | 426/281 |
| 4,806,373 | 2/1989 | Stumpf | 426/281 |
| 4,960,599 | 10/1990 | Cozzini | 426/281 |

OTHER PUBLICATIONS

Romans 1977 The Meat We Eat, The Interstate Printers & Publishers, Inc. Danville, Ill. pp. 576–583.

*The Science of Meat and Meat Products,* second ed. by J. F. Price and B. S. Schmeigert; pp. 178–201.
Single sheet entitled "Schematic Representation of an Emulsion, Showing Solubilized Protein and Fat Globules Coated with Protein".

*Primary Examiner*—Carolyn Paden
*Attorney, Agent, or Firm*—Laff, Whitesel, Conte & Saret

[57] ABSTRACT

The invention enables processed meat to absorb and retain a large quantity of water without causing the processed meat to ooze water, especially over an extended shelf life. The water replaces the fat in muscle meat. A first step is achieved by dissolving and removing fat and myosin from the muscle meat, thereby leaving a matrix of muscle fixers. By marinating the meat in a brine, water is introduced into the matrix, much as a dry sponge soak up water. Then, the meat is further processed by cooking it to entrap the water within the meat by closing and sealing the fiber of the matrix over it. The inventive process includes a preparation of a "bag" of ingredients which may be dropped simultaneously into a processing vat filled with water, as opposed to a system where the processing ingredients are added one at a time, in a prescribed sequence and time program. Among other things in the bag of ingredients, perhaps, the most important are isolated soy protein and carrageenan.

16 Claims, No Drawings

PROCESS FOR MAKING LOW CALORIE AND LOW CHOLESTEROL MUSCLE MEAT

BACKGROUND OF THE INVENTION

This invention relates to muscle meat processing and more particularly to processes for reducing the calories and cholesterol in muscle meats. In general muscle meats include beef, pork, lamb, poultry and the like.

The invention uses certain processes dealing with a retention of water in meat. Much background information is available to describe the characteristics and considerations of water in muscle meats. One example of such information is found in a book entitled "*The Science of Meat and Meat Products*" second ed. by J. F. Price and B. S. Schmeigert; D. H. Freeman and Co. Pub.; Library of Congress Catalog Card No. 71-130644, pages 178-201.

In general muscle meat includes myosin protein and collagen protein which are bound into a matrix of muscle sinews, along with fat and water. In order to reduce calories and cholesterol in such meats, it might seem that one should remove the fat and replace it with another substance, such as water, which retains the desirable characteristics of the muscle meat without adding either calories or cholesterol or adversely affecting the taste of the meat. However, it is much easier to have the thought than it is to accomplish the end.

First, very lean meat is tough to chew and does not taste very good. Some have compared eating meat with an extremely high lean content as being somewhat like trying to eat shoe leather.

Second, when a foreign substance is added to meat it tends to quickly lose its organoleptic qualities (the qualities of foods affecting the sensory organs, i.e. taste, color, odor, feel, etc.). Sometimes these qualities are also called the "mouthfeel". For example, processed meat may look gray or white, may have a grainy feel to the tongue, may ooze fluids, or the like, any one or more of which might make it psychologically difficult to eat the meat.

Third, especially for human consumption, foods must conform to and pass many governmental regulations. This makes it extremely difficult to process meats because many of the most practical processes are sometimes forbidden. For example, in the U.S. an addition of starch requires the meat label to state that it is imitation or substitute meat, which might adversely affect sales. In other countries an addition of starch would not cause a problem. Sometimes the processor is forbidden to add coloring to the meat with a resulting color suggesting spoiled food. Thus, meeting the requirements of all countries to process food becomes most difficult.

Some of the materials that could desirably be used to process food might be toxic if it becomes concentrated and more than a certain percentage of the meat.

Still another consideration is conforming to the dietary laws, habits, and appetite of different groups of people.

The list of problems faced by food processors could be multiplied endlessly. Hence, the task of providing a satisfactory meat process has many considerations going far beyond a mere production of a desired end result.

SUMMARY OF THE INVENTION

Accordingly, an object of the invention is to provide new and improved means for and methods of processing meats in order to reduce calories and cholesterol of muscle meat without adversely affecting the organoleptic properties of the meat.

A further object of the invention is to reduce the fat content without sacrifice of the organoleptic qualities of the meat.

Another object of the invention is to enable processed meat to absorb and retain a large quantity of water without causing the processed meat to ooze water especially over an extended shelf life. Here, an object is to replace fat with water in muscle meat and to retain the water through the preparation and eating of the meat.

DESCRIPTION OF THE PREFERRED EMBODIMENT

In keeping with an aspect of the invention, these and other objects are achieved by first dissolving and removing fat from the muscle meat, thereby leaving a matrix of muscle fibers. In greater detail, by marinating the meat in an inventive brine, fat is removed and water is introduced into the matrix, much as a dry sponge might soak up water. Then, the meat is cooked in order to entrap the water within the meat by closing and sealing the matrix of the fibers over it. The process includes a preparation of a "bag" of materials which may be dropped simultaneously into a processing vat filled with water, as opposed to a system where the processing materials are added one at a time, in a prescribed sequence and time program. Among other things in the bag of materials, perhaps the most important ingredients are carrageenan and isolated soy protein.

In greater detail, in a test of a carrageenan product used in an injection/absorption process, an experimentation began as an investigation of products that competed with soy proteins. The tests proved that carrageenan could increase cooking yields in whole muscle as well as in restructured meats. However, the protein count of the finished product as well as the fat content thereof decreased in proportion with the increased cooking yield. The reduction of protein was seen as a negative factor since it reduced the food value of the finished product.

Further investigative work used isolated soy proteins as part of an injection brine in order to reduce the fat values of meat. The product was acceptable at a 50-60% injection level. There was a reduction of fat calories brought about by a simple dilution process. A product that cooked to higher yields naturally decreased the analytical fat content since the brine used in the process was composed of 90% water. However, as further reductions in the total calories were investigated, it became evident that isolated soy protein, per se, should not be considered a single source which is used to achieve the water binding that is required to further reduce calories.

Experimentation with egg whites as well as with plasma proteins (blood derivatives) contributed to fat reduction. However, these materials added back about 44.4 percent of the extracted calories by maintaining protein. As experimentation continued, the organoleptic properties of the meat began to suffer. The product became grainy and extremely pale in color. In Asian countries coloring agents are permitted as a standard practice; therefore, when colored, the product containing egg whites, plasma, soy proteins and cassienates would be acceptable in Asia. However, in other countries, such as the U.S., where many coloring agents are not permitted, the pale color made the meat most unappetizing.

The properties of carrageenan, as an extender, were investigated in combination with isolated soy protein extensions. As the single source of extension in the muscle meats, carrageenan exhibited an excellent water holding ability, but when compared to a natural ham, the cooked product yielded only about 12% above its original raw, unpumped weight, and was judged as having a slimy organoleptic property. The isolated soy protein extensions were deemed grainy. Combining both ingredients in proper proportions into a brine for injection and absorption into meat improved the mouthfeel.

The difficulty of preparing a brine for this kind of diet type products is a major stumbling block when making muscle meat products that utilize a high water content as means of reducing calories. Heretofore, an individual ingredient that is to be hydrated or solubilized must be separately added in a programmed sequence.

According to the invention, a complete brine mix formula has been designed so that it can be added directly to the water used for the injection/absorption that is needed to create a reduced calorie diet type product. The inventive brine mix combines various proteins, carbohydrates, hydrocolloids, flavorings and phosphates into a single unit. The curing agents which were used were sodium nitrite and sodium erythorbate, as specified by the U.S. Department of Agriculture. The inventive brine blend generally has about a 25 to 35% by weight vegetable protein, 15 to 38% by weight salt, 10 to 18% by weight dextrose, 5 to 15% by weight carrageenan, 5 to 10% be weight plasma protein, and 5 to 10% by weight of other predetermined ingredients. A preferred list of ingredients for the inventive brine is:

|  | Range | Preferred Range | Preferred |
|---|---|---|---|
| Salt | 28-33% | 28.41-31.41% | 31.75% |
| Profam 646 Isolated Soy protein | 26-30 | 31.41-32.78 | 27.86 |
| "Clintose" White Crystalline Dextrose | 12-17 | 10.94-8.37 | 14.86 |
| Carrageenan (200 mesh) | 9-14 | 13.11-13.10 | 11.14 |
| Sodium Tripoly-phosphate | 5-9 | 6.56-5.24 | 07.43 |
| Flavoring (Pork Flavoring) (Plasma Protein) | 5-9 | 8.20-10.47 | 06.96 |

Of these ingredients, the most important are the isolated soy protein and carrageenan. The nitrogen solubility index (NSI) of this brine was in a range of 35 or less.

Since flavor involves a subjective judgment, the specific ratio of ingredients may vary with respect to taste. The contents of the inventive brine is based upon the injection/absorption of the liquid into the muscle tissue when the ratio is one part meat muscle tissue to one part of the inventive brine formula and when the brine ingredients have an acceptable organoleptic flavor profile. The effectiveness of the mix is determined by the ingredients which are present within the cell structure of the meat.

A composition of the dry mix for making the brine may vary in its percentages of each ingredient as the maximum/minimum levels are altered. The minimum amount of salt which is needed in the muscle tissue for proper restructuring is about 1.3% of the maximum amount that is based upon organoleptic tolerance. Generally, an acceptable amount of salt at about a 3% level of the final product is still palatable. The minimum level of carrageenan injected/absorbed into the meat muscle tissue is in the order of 0.6% of the final product. A minimum of about 1.5% isolated soy protein is usually required for functionality as well as for mouthfeel. The maximum levels are determined by an organoleptic acceptance of the product.

In the following table, the brine mix marked minimum provides a minimum recommended amount of each ingredient for the end product to be manufactured by the brine being absorbed/injected into the muscle tissue. The formula marked "maximum" causes a maximum amount of the formula to be absorbed/injected into the meat muscle structure.

| Formula | Minimum | Maximum |
|---|---|---|
| Salt | 28.41% | 31.41% |
| Isolated Soy Protein | 32.78 | 31.41 |
| Carrageenan | 13.11 | 13.10 |
| Sodium Tripolyphosphate | 6.56 | 5.24 |
| Pork Flavoring (Protein) | 8.20 | 10.47 |
| Dextrose | 10.94 | 8.37 |
|  | 100.00% | 100.00% |

The formula marked "minimum" is approximately 9.15% and water is 90.85% of the total brine. The maximum ingredients are preferably used in a ratio 19.1% brine and 80.9% water. The brine formula blend has a similar application when applied to comminuted meats, i.e., the composition of the brine formula may change when maximum minimum amounts are altered.

Next, a ham product or analog was prepared by using comminuted lean ham muscle meat injected with a combination of ingredients including Archer Daniels Midland Co. Isolated Soy Protein Ardex Sp 6 and an amount of Hercules Carrageenan Chp 1, in order to increase the weight of the ham by 80% (100 kg. become 180 kg. after the injection). A comminuted meat analogue is based upon a minimum amount of each ingredient, preferably the meat content exceeding about 50% of the entire analogue. One can vary each ingredient on an upscale, but the minimum percentage of each ingredient makes the product behave in an acceptable manner.

The preferred ingredients of the brine, at minimum percentages, are as follows:

| Isolated Soy Protein | 31.61% |
|---|---|
| Salt (NaCl) | 22.25 |
| Dextrose | 14.84 |
| Corn Syrup Solids | 14.84 |
| Carrageenan | 8.46 |
| Plasma Protein | 6.93 |

By using a minimum of approximately 6.87% of this brine blend combined with about 50.15% meat, and with enough water and seasoning agents added to equal 100%, a meat type analogue is produced that can assume any form or shape depending upon the shape of the container. The calories are reduced by the simple dilution with water. By increasing the percentage of this brine mix and by reducing the water content, it is also possible to produce a product having a lower calorie count.

In greater detail, an injected muscle was transferred to a meat grinder and reduced in size to particles which where approximately 0.60 cm. The product was re-weighed after grinding and then the weight was adjusted to have a preferred 1 to 1 ratio with brine, with a ratio range of 1:1.5 to 1.5:1 possible. The 100 kg original weight of the unpumped meat became 200 kg. of uncooked product. To this mixture a proportion of shank meat was added after combining it with isolated soy protein, water, and curing brine. The following ratio was used: 1 part isolated soy protein, 5 parts water, 5 parts shank meat and 1 part curing brine.

The product was equilibrated overnight (approximately 12 hours), then stuffed into moisture proof casings, and cooked with steam at 95% relative humidity to an internal temperature of 74-75 deg. C. The flavor level was somewhat bland but not offensive.

Of the ingredients in the inventive brine, the salt contributes to an extraction of myosin, which leaves a matrix of muscle fibers having voids which soak up water, somewhat in the manner of a sponge soaking up water. Either sodium potassium or sodium chloride may be used as the salt. During and after cooking, the fibers of the meat tend to swell and bond the water in place. An advantage of this approach is that cooking time is reduced from, perhaps, 30-minutes to about 12-minutes. This means that the production cost and the labor cost required for cooking is reduced by a factor which is on the order of 50%.

The carrageenan supplies a water bonding ability which prevents the water from oozing from the meat.

The isolated soy protein contributes a water holding capacity and supplies an organoleptic quality or mouthfeel which counteracts any tendencies of the processed meat toward a slimyness.

"Pro-Fam" 646 isolated soy protein is a standard commercial product of the Archer Daniels Midland Company, of Decatur, Ill., which describes it as a bland, spray-dried protein specially processed for ease of dispersion in water and other food liquids. This isolated soy protein is recommended for dry mix products which are later rehydrated by the end user. A typical chemical analysis of "Pro-Fam" 646 isolated soy protein is:

| | |
|---|---|
| Protein (N × 6.25, d.b.) | 90.0% |
| Moisture, max. | 6.0 |
| Ash (d.b.), max. | 5.5 |
| Fat (P.E. Extract) | 1.5 |
| pH | 6.25-6.95 |
| NSI | 50.0 |
| Calcium | 0.15 |
| Sodium | 1.10 |
| Potassium | 0.15 |
| Phosphorus | 0.80 |
| Magnesium | 0.09 |
| Iron | 0.01 |
| Zinc, ppm | 75.0 |
| Copper, ppm | 7.0 |
| Energy, Calc. Cal./100 gm | 359.0 |
| Typical Microbiological Analysis | |
| Standard Plate Count (35° C.), max. | 30,000/gm. |
| Yeasts & Molds, max. | 100/gm. |
| Typical Amino Acid Profile (g/16 g N) | |
| Arginine | 7.5 |
| Histidine | 2.6 |
| Isoleucine | 5.0 |
| Leucine | 8.4 |
| Lysine | 6.0 |
| Methionine | 1.2 |
| Phenylalanine | 5.6 |
| Threonine | 3.9 |
| Tryptophan | 1.2 |
| Valine | 5.0 |
| Serine | 5.6 |
| Glutamic Acid | 18.2 |
| Alanine | 4.6 |
| Glycine | 4.2 |
| Proline | 5.3 |
| Aspartic Acid | 11.0 |
| Tyrosine | 3.9 |
| Cystine/2 | 1.2 |

A soy protein concentrate sold under the trademark "Arcon VF" is also a standard commercial product of the Archer Daniels Midland Company, which describes it as a soy protein concentrate manufactured to remove soluble sugars and the anti-nutritional factors. Additional special processing results in superior dispersibility and suspension stability.

| Proximate Data (Typical) | |
|---|---|
| % Moisture | 5.0 |
| % Protein (N × 6.25) as is | 67.0 |
| % Protein (N × 6.25) M.F.B. | 70.0 |
| % Ash | 6.0 |
| % Fat (Pet. ether) | 0.8 |
| % Crude Fiber | 4.0 |
| % Carbohydrates (by difference) | 17.2 |
| pH (1:10 dispersion in water) | 6.8-7.0 |
| Calories (per 100 gm) | 290.0 |
| % Total Dietary Fiber | 23.0 |
| P.E.R. (Casein = 2.50) | 2.0 |
| Granulation | |
| Very Fine Powder | |
| Essential Amino Acids | |
| (gm/100 gm Protein) | |
| Lysine | 6.4 |
| Threonine | 4.4 |
| Leucine | 7.8 |
| Isoleucine | 4.8 |
| Valine | 4.9 |
| Tryptophan | 1.3 |
| Phenylalanine | 5.1 |
| Tyrosine | 3.4 |
| Methionine | 1.3 |
| Cystine | 1.4 |
| Histidine | 2.7 |
| Minerals | |
| (mg/100 gm) | |
| Potassium | 2150.0 |
| Sodium | 11.0 |
| Phosphorus | 800.0 |
| Calcium | 350.0 |
| Magnesium | 335.0 |
| Iron | 9.0 |
| Copper | 1.2 |
| Zinc | 3.5 |

The pork flavoring provides a release agent which allows the blend to form a colloid. The plasma protein is derived from blood. This flavoring is derived by drying into a powder form the flavoring nodes contained in meat or raw muscle tissue attached to edible pork bones. Preferably, no additives are used. The manufacturer describes a typical analysis of this flavoring as:

| | |
|---|---|
| Protein | 92-96.0% |
| Fat | 1.8 |
| Moisture | 5.0 |
| Standard Plate Count | Less than 3,000.0 |
| Solubility Index | 100.0 |
| pH | 6.5 |
| The amino acid composition of | |

-continued

| the flavoring is reported to be: | |
|---|---|
| Aspartic Acid | 9.48% |
| Threonine | 4.31 |
| Serine | 4.62 |
| Glutamic Acid | 7.42 |
| Glycine | 4.02 |
| Alanine | 7.63 |
| Valine | 7.68 |
| Isoleucine | 0.34 |
| Leucine | 12.54 |
| Tyrosine | 2.35 |
| Phenylalanine | 7.02 |
| Lysine | 8.49 |
| Histidine | 6.07 |
| Arginine | 3.36 |

A white crystalline dextrose product, sold under the trademark "Clintose" is an Archer Daniels Midland refined dextrose. This white, crystalline product, available in several granulations designed to fit individual processing needs. The granulation analysis shown below is that of an "A" granulation, which is suitable for many food applications. Its typical analysis, produced by the enzyme conversion of corn starch and refined by ion-exchange demineralization, is:

| Typical Analysis | |
|---|---|
| Color | White |
| Form | Dry, crystalline |
| Taste | Bland, sweet |
| Moisture | 8.5% |
| Dry Substance | 91.5% |
| Chemical Analysis | |
| Dextrose (dry basis) | 99.7% |
| Other Sugars | 0.3% |
| Ash | 100 ppm |
| Iron | 1 ppm |
| Granulation Analysis | |
| Through a #16 Screen, U.S. Standard Mesh | 99 Minimum |

A few U.S. Pat. Nos. which describe a background technology involving konjac flour are: 4,427,704; 4,582,714; and 4,746,528.

Experiment has shown that either citric or lactic acid may be added to the brine mixture in order to adjust its pH, to improve the color of the meat product, and to extend the shelf life of the product.

Any suitble U.S.D.A. approved curing agent may be added to the brine mixture, within approved limits, in order to produce the known curing effects.

Starch may also be added to the brine. In the U.S., it is necessary to label a product containing starch as imitation or substitute ham, etc. in order to meet government labeling requirements. However, no other adverse effect would be produced by such a use of starch.

EXAMPLE 1

A brine solution was created by mixing 10.77 kg. of the above described brine mix formula with 89.23 liters of water and mixed by an air drive Lightning Mixer for 12 minutes or until all particles were hydrated, solubilized, and formed into an excellent colloid. The brine was then injected into lean ham muscle to increase the weight of the raw material by 70%. The injected muscle tissue was then transferred to a grinder and reduced in size through a kidney plate. A two blade knife was used to fray the edges of the meat particles in order to aid myosin extraction.

The ground muscle pieces were then re-weighed and transferred to a Vacuum Paddle Mixer. The meat weight and brine weight were adjusted to a preferred 1 to 1 ratio, although a range of this ratio may be in the order of 1:1.5 to 1.5:1. (100 kg. meat plus 100 kg. brine to made combination of injected o weight, as well as added free brine.) A conventional portion of shank meat was ground through a 3mm grinding plate and transferred to a silent cutter. The ground shank was combined with isolated soy protein, water and curing brine in order to form the inventive composition: 1-part isolated soy protein; 5-parts shank meat; 5-parts water; and 1-part curing brine.

When the added brine was absorbed in the mixing process, the shank composition was added and mixed under vacuum until the myosin extraction was completed. The product was allowed to equilibrate under vacuum for 16-hours.

The product was then stuffed into fibrous casings for smoking and into a moisture proof casing for steam processing. All of the product was then cooked to an internal temperature of 74–75 deg. C. (166–167 deg. F.). After cooking, the product was showered for 45-minutes with tap water, allowed to drip dry at room temperature for 15-minutes, then placed into a 0–2 deg. C. cooler, and chilled to 2–3 deg. C.

The chilled weight of the smoked hams had a cooking yield of 90% of the injected/absorbed weight for a finished yield of 89 percent above the raw and unpumped weight. A 100 kg. of raw trimmed ham now weighted 189 kg. of cooked ham. The ham product that was cooked in the moisture proof casings showed a processing yield of 98.30% or 100 kg. Or raw unpumped hams now weighed 198.6 kg. cooked.

Experimentation with different flavorings produced similar o results with beef and poultry when handled in approximately the same manner.

EXAMPLE 2

Calories can be reduced in a frankfurter type of product by trimming the meat portion to 5% fat (analytically determined) and by increasing the water holding ability by properly blending vegetable proteins, carrageenan and plasma protein with salts and seasonings. The vegetable protein, plasma protein, and the carrageenan combine with myosin which was thus extracted from the lean meat in order to form a high capacity water holding matrix. The resulting product reduces calories by holding high amounts of added moisture and yet retaining the form and shape of a normal frankfurter.

The following ingredients were blended to create a brine which could be used in this frankfurter type analogue.

| Isolated Soy Protein | 29.55% |
|---|---|
| Salt (NaCl) | 20.80 |
| Clintose Dextrose | 13.87 |
| Corn Syrup Solids | 13.87 |
| Carrageenan | 08.46 |
| Plasma Protein | 06.93 |
| Ground White Pepper | 01.73 |
| Paprika Asta | 01.73 |
| Ground Coriander | 01.11 |
| Ground Nutmeg | 0.83 |
| Onion Powder | 0.42 |
| Ground Allspice | 0.42 |
| Garlic Powder | 0.42 |
| Ground Mace | 0.14 |
| Ground Cardoman | 0.14 |

The curing agents were any suitable product allowed by the U.S.D.A.

30.15 kg. of 95% lean beef and 20.00 kg. of 95% lean pork were combined with 43.50 liters of ice water and 7.35 kg. of the above described frankfurter extension blend. The resulting meat was finely comminuted in a silent cutter until a smooth paste type of emulsion was formed. The product was then vacuum mixed for 3 minutes and stuffed in appropriately sized casings. The product was heat processed to 74-75 deg. C and then chilled to 32 deg. C. in a shower. It was then placed in a cooler and further chilled to 1-2 deg. C. The product was peeled and packaged.

Fatless Fat Blend Containing Vegetable Protein

The above described products were judged satisfactory. However, further experimentation led to a product having an improved mouthfeel which was attained by replacing 5% of the added water with the fatless fat blend described below in Example 3.

A blend containing vegetable protein ("Fatless Fat") is a non-fat product which contributes a fat like quality not only to the muscle meat products described herein, but also to almost any food product where a fat organoleptic quality may be required, as in sauces, gravy, beverages, bread, dairy products, for example. The fatless fat blend contributes to the taste/feel of a product that contains higher fat percentages.

EXAMPLE 3

Since 100% visible fat is never 100% fat by chemical analysis, vegetable protein may be added to increase the analysis and thus duplicate a theoretical protein value found in 100% visible fat product. The protein blend acts as a retardant for a thermally irreversible gels found in konjac flour after freezing. Konjac flour is a standard commercial product, available from many sources. The adjusted formula of konjac flour and vegetable protein may be added to extremely lean meat patties in order to improve both the texture and the succulence of the patties by giving them a higher fat content. The meat patties also contain a textured vegetable protein (soy flour) or textured soy concentrates as prescribed by U.S.D.A. regulations.

The fatless fat blend is described as:

| Konjac Flour | 49.50% |
| Arcon VF | 30.69 |
| Clintose Dextrose | 09.91 |
| NaCl | 04.95 |
| Sodium Tripolyphosphate | 04.95 |
| Total | 100.00 |

By combining this mixture at a ratio of 1 part mix to 9 parts water (91 deg. C.) and then chopping the resulting product at high speed in a silent cutter for the proper length of time, a stable matrix is formed. The matrix remains firm at room temperatures. The organoleptic evaluation is improved significantly by combining this hydrated product at a five percent level in an extremely lean meat pattie 5% fat or less.

A model formula evaluated organopleticly acceptable is:

| Lean Beef 5% fat | 70.00% |
| Water | 18.85 |
| Textured Soy Concentrate | 05.55 |
| Fatless Fat Blend | 05.00 |
| NaCl | 00.35 |
| Sodium Tripolyphosphate | 00.25 |
| Total | 100.00 |

EXAMPLE 4

Breast meat derived from either turkey or chicken is extremely dry after cooking, roasting, broasting or deep fat frying if the skin and fat were removed before cooking for dieting purposes. By adding the fatless fat blend at ranges that fall between 5 and 25% of the formula, the dryness may be overcome:

| One experiment used the following proportions: | |
| --- | --- |
| Skinless, Boneless Chicken Breast | 85.00% |
| Fatless Fat Blend | 10.00 |
| Commercial Poultry seasoning | .30 |
| Carageenan | .20 |
| Sodium Phosphate | .20 |
| Moisture added in the form of ice | 4.10 |

The boneless, skinless chicken breast meat was passed through a 1 inch (2.54 cm) grinding plate. All ingredients were added to a vacuum mixer and mixed until homogenous. The well mixed ingredients were then formed into bite size pieces, all having the same thickness and diameter by stuffing the homogenous mixture into a skinless sausage casing which was then frozen. The frozen tubes of product were cut to size and then battered and breaded. Some product was stored frozen and cooked at later dates. Some product was pre-cooked and frozen. The pre-cooked items were then reheated in either an ordinary or a micro-wave oven to eating temperature. The product was evaluated as being better than similar products cooked with the skin, as well as poultry meat containing no skin or natural fat.

EXAMPLE 5

| Poultry Variation | |
| --- | --- |
| Ingredient: | |
| Boneless Chicken Breast 6 & Fat | 35.00% |
| Boneless Chicken Dark Meat | 30.00 |
| Fatless Fat Blend | 7.30 |
| Textured Soy Protein Concentrate | 5.55 |
| Hydration Water for Concentrate | 18.85 |
| Commercial Seasoning Blend (Salt Dextrose, Onion powder, MSG, White Pepper) | 2.90 |
| Sodium Phosphate | .25 |
| Carageenan | .15 |

White chicken meat derived from boneless breast was ground through a 0.75 inch (1.9 cm) grinding plates. The dark meat was ground through a 0.25 inch (0.64 cm) grinding plate. All ingredients were combined in a vacuum mixer and mixed until homogenous. The temperature of the meat was controlled by adding dry ice $CO_2$ to 25 deg. F. (3-4 deg. C.). After mixing, the product was re-ground through a 0.25 inch (0.64 cm) plate and formed in a commercial patty maker. The chicken pattie was frozen, battered and breaded with commercial breading, and then the resulting breaded pattie was frozen. Organoleptic evaluation revealed that the fatless fat treated pattie was more acceptable when compared to a pattie that contained all of the same ingredients, excluding the fatless fat.

Pork Formulas using the same concept were tested in the same manner with the same types of results. It would seem that regardless of the meat species the lean dry mouthfeel is improved with the addition of fatless fat at levels from 5 to 20%.

EXAMPLE 6

The caloric count of a frankfurter type of analogue was successfully reduced; however, the organoleptic quality of the end product lacked a mouthfeel and surface protein texture which is commonly associated with or analagous to products that have a higher fat percentages, by chemical analysis (Modified Babcock System). The range of fat percentages were from 10 to 22% in all meat blends and 4 to 10% in frankfurters made from fish (Surimi).

The products tested may contain blends of animal species as well as combinations of animal species and poultry, such as all beef franks, mixed pork and beef franks, pork, beef, and chicken franks, all turkey franks, all chicken franks, etc. All of these and similar meat combinations are referred to in this example as "meat".

| Ingredient: | |
|---|---|
| Meat Blend 5% Fat | 50.15 |
| Fatless Fat Blend | 5.00 |
| Added Moisture | 37.50 |
| formula improved blend of Example 2 | 7.35 |

The approximate range of the percentages of fatless fat blend in this example extends from substantially 5% minimum to 20% minimum. The meat and the water percentages were reduced equally to allow the fatless fat level to be changed. The fat percentages of the meat blend have ranged from 10 to 20%

The inventive process may be used for treating a combination of two or more muscle meats. The process begins with a first muscle meat with a brine solution to increase the weight of the muscled meat to above at least 50% by weight. Then the injected muscle meat is ground and mixed with said brine to provide a ratio of about 1:1.5 to about 1.5 to 1 of total brine to muscled meat and to provide a first brine-ground muscled meat mixture. A second ground meat mixture is a combination of about 0.5 to 1.5 parts by weight vegetable protein, 4 to 6 parts by weight of second ground meat, 4 to 6 parts by weight water and 0.5 to 1.5 parts by weight a brine blend. The first and second ground meat mixtures are mixed for a predetermined time and then cooked at a predetermined temperature.

The brine composition may comprise salt, vegetable protein, dextrose, carrageenan, alkali metal tripolyphosphate and flavoring. The ratio of brine solution to muscle meat in the first brine ground muscle meat mixture is about 1:1. The preferred vegetable protein is soy protein. The ground injected meat and brine are vacuumed mixed. The first and second ground meat are also vacuum mixed.

Those who are skilled in the art will readily perceive how to modify the invention. Therefore, the appended claims are to be construed to cover all equivalent structures which fall within the true scope and spirit of the invention.

I claim:

1. A process for treating muscle meats comprising:
   injecting muscled meat with a brine solution to increase the weight of the muscle meat to above at least 50% by weight;
   grinding the injected muscled meat;
   mixing the ground injected muscled meat with said brine to provide a ratio of about 1:1.5 to about 1.5 to 1 of total brine to muscled meat to provide a first brine-ground muscled meat mixture;
   preparing a second ground meat mixture of about 0.5 to 1.5 parts by weight vegetable protein, 4 to 6 parts by weight of second ground meat, 4 to 6 parts by weight water and 0.5 to 1.5 parts by weight a brine blend;
   mixing the first and second ground meat mixtures for a predetermined time; and
   cooking the mixed first and second ground mixtures to a predetermined temperature.

2. The process of claim 1 wherein the brine composition comprises salt, vegetable protein, dextrose, carrageenan, alkali metal tripolyphosphate and flavoring;
   the ratio of brine solution to muscle meat in the first brine ground muscle meat mixture is about 1:1;
   said vegetable protein is soy protein;
   the ground injected meat and brine are vacuum mixed, and the first and second ground meat are vacuum mixed.

3. The process of claim 1 comprising adding a fatless fat blend containing to the first vegetable protein to the first and second meat mixture.

4. The process of claim 3 wherein the fatless fat composition consists of Konjac flour, soy protein concentrate, white crystalline dextrose, potassium or sodium chloride, potassium or sodium tripolyphosphate.

5. A process for treating muscle meats comprising
   grinding the muscle meats;
   mixing the muscle meats with a brine solution in the parts by weight ratio of about 1:1.5 to 1:5 to 1 of total brine solution to muscle meats; said brine solution being a blend having about a 25 to 35% by weight vegetable protein, 15 to 38% by weight salt, 10 to 18% by weight dextrose, 5 to 15% by weight carrageen, 5 to 10% by weight plasma protein, and 5 to 10% by weight of other ingredients to flavor the treated meats;
   heat processing the mixture to a predetermined interval temperature; and
   cooling heated mixture.

6. The process of claim 5 wherein the brine solution consists of isolated soy protein, salt, white crystalline dextrose, corn syrup solids, carrageenan, plasma protein, white pepper, paprika asta, coriander, nutmeg, onion, allspice, garlic, mace, and cardoman.

7. The process of claim 6 wherein the muscle meats and brine are vacuum mixed.

8. The process of claim 5 comprising adding a fatless fat blend containing vegetable protein to the brine and muscle meat mixture.

9. The process of claim 5 wherein the brine blend consists of:
   about 28 to 33% by weight salt,
   about 26 to 30% by weight isolated soy protein,
   about 9 to 14% by weight carrageenan,
   about 5 to 9% by weight sodium tripolyphosphate,
   about 12 to 17% by weight dextrose, about 5 to 9% by weight additional ingredients.

10. The process of claim 9 wherein a brine solution is prepared mixing said brine blend with about 9 to 91% by weight of water.

11. The process of claim 9 wherein the brine blend consists of:
about 28.41 to 31.41% by weight salt,
about 32.78 to 31.41% by weight soy protein,
about 13.11 to 13.10% by weight carrageenan,
about 6.56 to 5.24% by weight sodium tripolyphosphate,
about 8.20 to 10.47% by weight protein flavoring,
about 10.94 to 8.37% by weight dextrose.

12. A product made by the process of any one of the claims 1-8.

13. A brine blend which is a combination of ingredients ready to be mixed with water for treating muscle meats, said brine blend comprising:
about 28 to 33% by weight salt,
about 26 to 30% by weight isolated soy protein,
about 9 to 14% by weight carrageenan,
about 5 to 9% by weight sodium tripolyphosphate,
about 12 to 17% by weight dextrose, and
about 5 to 9% by weight additional ingredients for enhancing flavor.

14. The brine blend of claim 13 combined with water.

15. The brine blend of claim 13 comprising:
about 28.41 to 31.41% by weight salt,
about 32.78 to 31.41% by weight soy protein,
about 13.11 to 13.10% by weight carrageenan,
about 6.56 to 5.24% by weight sodium tripolyphosphate,
about 8.20 to 10.47% by weight protein flavoring,
about 10.94 to 8.37% by weight dextrose.

16. The brine blend of claim 15 combined with water.

* * * * *